United States Patent
Wiegand et al.

(10) Patent No.: US 11,472,283 B2
(45) Date of Patent: Oct. 18, 2022

(54) VEHICLE COOLING SYSTEMS AND METHODS

(71) Applicant: Oshkosh Defense, LLC, Oshkosh, WI (US)

(72) Inventors: Dan Wiegand, Oshkosh, WI (US); Michael Pertile, Oshkosh, WI (US); Andrew Prust, Oshkosh, WI (US)

(73) Assignee: Oshkosh Defense, LLC, Oshkosh, WI (US)

( * ) Notice: Subject to any disclaimer, the term of this patent is extended or adjusted under 35 U.S.C. 154(b) by 111 days.

(21) Appl. No.: 17/140,506

(22) Filed: Jan. 4, 2021

(65) Prior Publication Data

US 2021/0122229 A1    Apr. 29, 2021

Related U.S. Application Data

(63) Continuation of application No. 16/529,294, filed on Aug. 1, 2019, now Pat. No. 10,913,346, which is a continuation of application No. 15/957,207, filed on Apr. 19, 2018, now Pat. No. 10,414,266.

(60) Provisional application No. 62/491,979, filed on Apr. 28, 2017, provisional application No. 62/491,981, filed on Apr. 28, 2017.

(51) Int. Cl.
| | |
|---|---|
| *B60K 11/04* | (2006.01) |
| *B60K 11/08* | (2006.01) |
| *F02B 67/06* | (2006.01) |
| *F01P 5/06* | (2006.01) |
| *F01P 11/10* | (2006.01) |
| *B60K 25/02* | (2006.01) |

(52) U.S. Cl.
CPC .............. *B60K 11/04* (2013.01); *B60K 11/08* (2013.01); *B60K 25/02* (2013.01); *F01P 5/06* (2013.01); *F01P 11/10* (2013.01); *F02B 67/06* (2013.01)

(58) Field of Classification Search
CPC combination set(s) only.
See application file for complete search history.

(56) References Cited

U.S. PATENT DOCUMENTS

| | | | | |
|---|---|---|---|---|
| 3,165,164 A | * | 1/1965 | Hostetler | B62D 33/067 180/89.15 |
| 3,882,951 A | * | 5/1975 | Conley | B60K 5/10 180/69.1 |
| 4,018,270 A | * | 4/1977 | Kolinger | F01P 11/12 165/122 |
| 4,071,009 A | * | 1/1978 | Kraina | B60R 13/0838 181/204 |
| 5,193,608 A | * | 3/1993 | Sekine | B60K 11/08 165/44 |
| 5,597,047 A | * | 1/1997 | Thompson | F28F 9/002 180/68.6 |

(Continued)

*Primary Examiner* — Erez Gurari
(74) *Attorney, Agent, or Firm* — Foley & Lardner LLP (57) ABSTRACT

A vehicle includes a chassis, a cab coupled to the chassis, a prime mover coupled to the chassis and positioned at least one of beneath or behind the cab, and an accessory drive. The accessory drive includes an accessory and connecting shaft. The accessory is positioned forward of a front of the cab such that the accessory is spaced from the prime mover. The connecting shaft extends from the prime mover, past the front of the cab, and to the accessory. The connecting shaft is positioned to facilitate driving the accessory with the prime mover.

20 Claims, 11 Drawing Sheets

(56) References Cited

U.S. PATENT DOCUMENTS

| | | | |
|---|---|---|---|
| 6,648,089 B1 * | 11/2003 | Wooldridge | B62D 25/084 |
| | | | 267/140.13 |
| 6,688,424 B1 * | 2/2004 | Nakada | B60K 11/04 |
| | | | 181/204 |
| 7,198,130 B2 * | 4/2007 | Schimke | B60K 6/46 |
| | | | 180/291 |
| 7,270,346 B2 * | 9/2007 | Rowe | B60G 17/04 |
| | | | 280/781 |
| 8,465,025 B2 | 6/2013 | Venton-Walters et al. | |
| 8,596,648 B2 | 12/2013 | Venton-Walters et al. | |
| 8,764,029 B2 | 7/2014 | Venton-Walters et al. | |
| 8,801,017 B2 | 8/2014 | Ellifson et al. | |
| 8,821,130 B2 | 9/2014 | Venton-Walters et al. | |
| 8,991,834 B2 | 3/2015 | Venton-Walters et al. | |
| 8,991,840 B2 | 3/2015 | Zuleger et al. | |
| 9,174,686 B1 * | 11/2015 | Messina | B62D 33/04 |
| 9,291,230 B2 | 3/2016 | Ellifson et al. | |
| 9,303,715 B2 | 4/2016 | Dillman et al. | |
| 9,581,153 B2 | 2/2017 | Venton-Walters et al. | |
| 9,669,679 B2 | 6/2017 | Zuleger et al. | |
| 9,688,112 B2 | 6/2017 | Venton-Walters et al. | |
| 9,707,869 B1 | 7/2017 | Messina et al. | |
| 9,731,594 B2 * | 8/2017 | Wildgrube | F17C 5/06 |
| 9,809,080 B2 | 11/2017 | Ellifson et al. | |
| 9,944,145 B2 | 4/2018 | Dillman et al. | |
| 10,030,737 B2 | 7/2018 | Dillman et al. | |
| 10,214,876 B2 * | 2/2019 | Nakagawa | B60K 6/48 |
| 10,414,266 B1 * | 9/2019 | Wiegand | B60K 11/04 |
| 2001/0011614 A1 * | 8/2001 | Sasano | F01P 11/04 |
| | | | 296/203.02 |
| 2002/0020572 A1 * | 2/2002 | Wooldridge | B60K 11/04 |
| | | | 180/291 |
| 2005/0252635 A1 * | 11/2005 | Adamson | F02B 29/0475 |
| | | | 165/41 |
| 2005/0274491 A1 * | 12/2005 | Evans | B60K 11/02 |
| | | | 165/98 |
| 2006/0288969 A1 * | 12/2006 | Thomas | F16H 7/24 |
| | | | 416/179 |
| 2007/0023253 A1 * | 2/2007 | Wayman | F16D 25/0632 |
| | | | 192/66.22 |
| 2007/0068716 A1 * | 3/2007 | Kunikata | B60K 11/04 |
| | | | 180/69.4 |
| 2007/0144713 A1 * | 6/2007 | Sugimoto | F28F 9/002 |
| | | | 165/140 |
| 2009/0001675 A1 * | 1/2009 | Higashi | F01P 3/18 |
| | | | 277/650 |
| 2009/0007856 A1 * | 1/2009 | Minekawa | F02D 41/021 |
| | | | 123/41.11 |
| 2009/0020081 A1 * | 1/2009 | Claypole | B60K 11/02 |
| | | | 123/41.31 |
| 2010/0006043 A1 * | 1/2010 | Kardos | B60K 11/04 |
| | | | 165/104.11 |
| 2010/0018732 A1 * | 1/2010 | Daniel | B60K 11/04 |
| | | | 172/781 |
| 2011/0073402 A1 * | 3/2011 | Manabe | E02F 9/0866 |
| | | | 180/65.245 |
| 2011/0114286 A1 * | 5/2011 | Komatsu | F04D 29/544 |
| | | | 165/51 |
| 2011/0139525 A1 * | 6/2011 | Karl | B60K 11/08 |
| | | | 180/68.1 |
| 2011/0240387 A1 * | 10/2011 | Piggott | B60K 11/04 |
| | | | 180/68.4 |
| 2012/0100790 A1 * | 4/2012 | Miesterfeld | B60K 11/085 |
| | | | 454/75 |
| 2012/0241128 A1 * | 9/2012 | Vacca | B60K 11/085 |
| | | | 165/44 |
| 2013/0327582 A1 * | 12/2013 | Kim | B60K 13/02 |
| | | | 180/68.3 |
| 2014/0056675 A1 * | 2/2014 | Kitaoka | E02F 3/283 |
| | | | 414/685 |
| 2014/0060953 A1 * | 3/2014 | Wetterlund | B60W 30/1886 |
| | | | 180/53.8 |
| 2015/0251610 A1 * | 9/2015 | Kugelstadt | B60K 11/02 |
| | | | 180/65.245 |
| 2015/0352944 A1 * | 12/2015 | Hoffmann | F01P 5/04 |
| | | | 180/65.21 |
| 2015/0369114 A1 * | 12/2015 | Bruss | F01P 11/08 |
| | | | 123/41.33 |
| 2016/0138243 A1 * | 5/2016 | Ogura | E02F 9/0866 |
| | | | 180/309 |
| 2016/0176283 A1 * | 6/2016 | Hicke | B60K 11/04 |
| | | | 180/292 |
| 2017/0021721 A1 * | 1/2017 | Kurokawa | B60K 11/06 |
| 2017/0218832 A1 * | 8/2017 | Kurokawa | B62D 25/04 |
| 2018/0003101 A1 * | 1/2018 | Kondou | B60K 11/04 |
| 2018/0038074 A1 * | 2/2018 | Nishihata | E02F 9/226 |
| 2018/0126823 A1 * | 5/2018 | Schoneboom | B60K 11/04 |
| 2018/0147915 A1 * | 5/2018 | Tezuka | F01P 7/16 |
| 2018/0162401 A1 * | 6/2018 | Yamazaki | F02D 11/105 |
| 2018/0312039 A1 * | 11/2018 | Sakane | B60H 1/16 |

* cited by examiner

VEHICLE COOLING SYSTEMS AND METHODS

CROSS-REFERENCE TO RELATED PATENT APPLICATIONS

This application is a continuation of U.S. patent application Ser. No. 16/529,294, filed Aug. 1, 2019, which is a continuation of U.S. patent application Ser. No. 15/957,207, filed Apr. 19, 2018, which claims the benefit of U.S. Provisional Application No. 62/491,979, filed Apr. 28, 2017, and U.S. Provisional Application No. 62/491,981, filed Apr. 28, 2017, all of which are incorporated herein by reference in their entireties.

BACKGROUND

A vehicle typically includes a fan positioned to provide a cooling operation to a radiator of the vehicle. Such radiators and fans are typically positioned immediately in front of an engine or other prime mover of the vehicle. Further, the fans are typically directly coupled to the engine and the radiators are typically coupled to the chassis of the vehicle.

SUMMARY

One embodiment relates to a vehicle. The vehicle includes a chassis, a cab coupled to the chassis, a prime mover coupled to the chassis and positioned at least one of beneath or behind the cab, and an accessory drive. The accessory drive includes an accessory and connecting shaft. The accessory is positioned forward of a front of the cab such that the accessory is spaced from the prime mover. The connecting shaft extends from the prime mover, past the front of the cab, and to the accessory. The connecting shaft is positioned to facilitate driving the accessory with the prime mover.

Another embodiment relates to a system for a vehicle. The system includes an accessory drive. The accessory drive includes an accessory and a connecting shaft configured to couple the accessory to a prime mover of the vehicle. The connecting shaft has a length such that (i) the accessory is positioned forward of a front of a cab of the vehicle and (ii) the connecting shaft extends rearwardly past the front of the cab to the prime mover when the accessory drive is installed on the vehicle.

Still another embodiment relates to a vehicle. The vehicle includes a chassis, a cab coupled to the chassis, a prime mover coupled to the chassis and positioned at least one of beneath or behind the cab, an accessory positioned forward of a front of the cab such that the accessory is spaced from the prime mover, and a connecting shaft extending from the prime mover, past the front of the cab, and coupled to the accessory. The connecting shaft facilitates driving the accessory with the prime mover. The accessory includes at least one of a fan or an alternator.

The invention is capable of other embodiments and of being carried out in various ways. Alternative exemplary embodiments relate to other features and combinations of features as may be recited herein.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Overview

According to an exemplary embodiment, a vehicle includes various components that improve performance relative to traditional systems. According to an exemplary embodiment, the vehicle of the present disclosure includes a cooling system (e.g., a cooling pack, etc.) positioned remotely from a prime mover (e.g., an engine, etc.) of the vehicle. The cooling system may include a radiator, a fan, a fan shroud, and conduits fluidly coupling the radiator to the engine. According to an exemplary embodiment, the engine is positioned beneath and/or at least partially behind a front cabin of the vehicle and the cooling system is positioned at a front end of the chassis, ahead of the front cabin such that an airgap (e.g., open space, a cab-tilt space, etc.) is formed between the engine and the cooling system. According to an exemplary embodiment, the fan and the fan shroud are coupled to the chassis with a common support structure such that relative movement therebetween may be minimized and/or substantially prevented. Such minimization facilitates reducing the tip clearance between the fan (e.g., the fins, tips, etc. of the fan) and the fan shroud, which may thereby increase the efficiency of the cooling system. According to an exemplary embodiment, the airgap and the minimized tip clearance increases the cooling capacity of the cooling system such that the prime mover may be tuned for increased performance.

According to an exemplary embodiment, the cooling pack of the present disclosure includes a fan system positioned remotely from the prime mover of the vehicle. The fan system may include a fan and a pulley assembly having a plurality of pulleys and a belt. The pulley assembly may be driven by a connecting shaft that extends between the prime mover and the pulley assembly. In other embodiments, the connecting shaft is directly coupled to the fan. The prime mover may thereby drive the remotely positioned fan through the connecting shaft. In some embodiments, the pulley assembly is coupled to an alternator such that the alternator is also positioned remotely from the engine. According to an exemplary embodiment, the engine is positioned beneath and/or at least partially behind a front cabin of the vehicle and the fan system and/or alternator are positioned forward of the front cabin.

Figure 1:
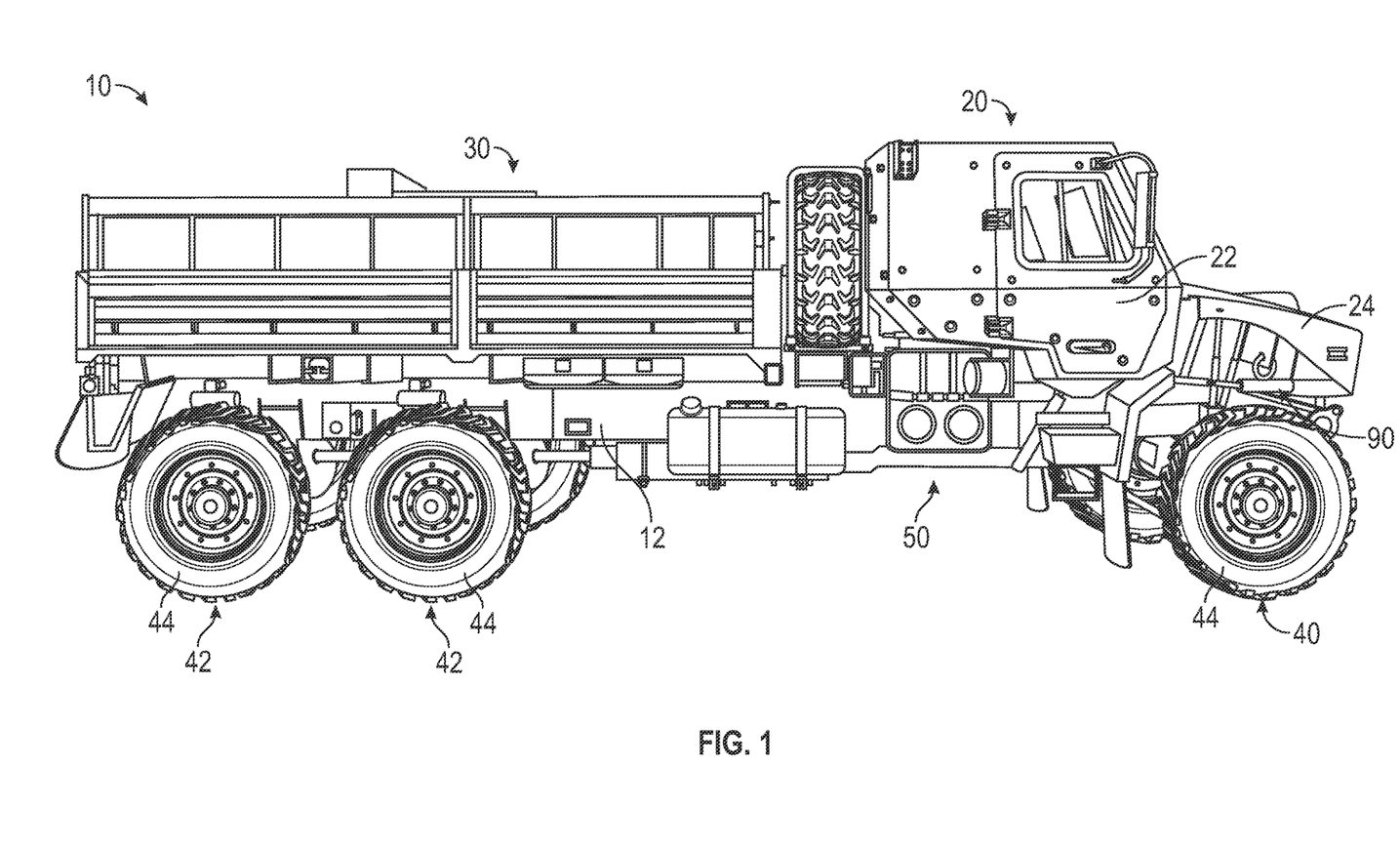
FIG. 1 is a side view of a vehicle, according to an exemplary embodiment.

According to the exemplary embodiment shown in FIG. 1, a vehicle, shown as vehicle 10, includes a chassis, shown as frame 12, that supports a body assembly including a first portion, shown as front cabin 20, and a second portion, shown as mission equipment 30. As shown in FIG. 1, the mission equipment 30 is disposed behind the front cabin 20. The frame 12 of the vehicle 10 engages a plurality of tractive assemblies, shown as front tractive assemblies 40 and rear tractive assemblies 42. According to an exemplary embodiment, the vehicle 10 is a military ground vehicle. In other embodiments, the vehicle 10 is an off-road vehicle such as a utility task vehicle, a recreational off-highway vehicle, an all-terrain vehicle, a sport utility vehicle, and/or still another vehicle. In yet other embodiments, the vehicle 10 is another type of off-road vehicle such as mining, construction, and/or farming equipment. In still other embodiments, the vehicle 10 is an aerial truck, a rescue truck, an aircraft rescue and firefighting (ARFF) truck, a concrete mixer truck, a refuse truck, a commercial truck, a tanker, an ambulance, and/or still another vehicle.

According to an exemplary embodiment, the frame 12 defines a longitudinal axis. The longitudinal axis may be generally aligned with a frame rail of the frame 12 of the vehicle 10 (e.g., front-to-back, etc.). In some embodiments, the vehicle 10 includes a plurality of front tractive assemblies 40 and/or a plurality of rear tractive assemblies 42 (e.g., one, two, etc.). The front tractive assemblies 40 and/or the rear tractive assemblies 42 may include brakes (e.g., disc brakes, drum brakes, air brakes, etc.), gear reductions, steering components, wheel hubs, wheels, tires, and/or other features. As shown in FIG. 1, the front tractive assemblies 40 and the rear tractive assemblies 42 each include tractive elements, shown as wheel and tire assemblies 44. In other embodiments, at least one of the front tractive assemblies 40 and the rear tractive assemblies 42 include a different type of tractive element (e.g., a track, etc.).

According to an exemplary embodiment, the front cabin 20 includes one or more doors, shown as doors 22, that facilitate entering and exiting an interior of the front cabin 20. The interior of the front cabin 20 may include a plurality of seats (e.g., two, three, four, five, etc.), vehicle controls, driving components (e.g., steering wheel, accelerator pedal, brake pedal, etc.), etc. As shown in FIG. 1, the vehicle includes a hood, shown as hood 24, positioned in front of the front cabin 20 over the front tractive assemblies 40. According to the exemplary embodiment shown in FIG. 1, the mission equipment 30 includes a cargo body configured to facilitate transporting various military equipment (e.g., medical supplies, ammunition, weapons, missiles, personnel, etc.). In other embodiments, the mission equipment 30 includes a truck bed or a flat bed. In some embodiments, the mission equipment 30 additionally or alternatively includes a boom lift. In another embodiment, the mission equipment 30 includes an at least partially enclosed troop transport cabin configured to facilitate transporting troops (e.g., eight, ten, twelve, twenty, etc.) with the vehicle 10.

According to an exemplary embodiment, the vehicle 10 includes a powertrain system. The powertrain system may include a primary driver (e.g., an engine, a motor, etc.), shown as prime mover 50, an energy generation device (e.g., a generator, etc.), and/or an energy storage device (e.g., a battery, capacitors, ultra-capacitors, etc.) electrically coupled to the energy generation device. As shown in FIG. 1, the prime mover 50 is coupled to the frame 12 of the vehicle 10 beneath and/or at least partially behind the front cabin 20. In other embodiments, the prime mover 50 is otherwise positioned (e.g., underneath the hood 24 of the vehicle 10, etc.). The prime mover 50 may receive fuel (e.g., gasoline, diesel, etc.) from a fuel tank and combust the fuel to generate mechanical energy. A transmission may receive the mechanical energy and provide an output to the generator. The generator may be configured to convert mechanical energy into electrical energy that may be stored by the energy storage device. The energy storage device may provide electrical energy to a motive driver to drive at least one of the front tractive assemblies 40 and the rear tractive assemblies 42. In some embodiments, each of the front tractive assemblies 40 and/or the rear tractive assemblies 42 include an individual motive driver (e.g., a motor that is electrically coupled to the energy storage device, etc.) configured to facilitate independently driving each of the wheel and tire assemblies 44. In some embodiments, a transmission of the vehicle 10 is rotationally coupled to the prime mover 50, a transfer case assembly, and one or more drive shafts. The one or more drive shafts may be received by one or more differentials configured to convey the rotational energy of the drive shaft to a final drive (e.g., half-shafts coupled to the wheel and tire assemblies 44, etc.). The final drive may then propel or moves the vehicle 10. In such embodiments, the vehicle 10 may not include the generator and/or the energy storage device. The powertrain of the vehicle 10 may thereby be a hybrid powertrain or a non-hybrid powertrain. According to an exemplary embodiment, the prime mover 50 is a compression-ignition internal combustion engine that utilizes diesel fuel. In alternative embodiments, the prime mover 50 is another type of device (e.g., spark-ignition engine, fuel cell, electric motor, etc.) that is otherwise powered (e.g., with gasoline, compressed natural gas, hydrogen, electricity, etc.).

Cooling Pack Placement

According to the exemplary embodiment shown in FIGS. 2-6, the vehicle 10 include a cooling system, shown as cooling pack 100. As shown in FIGS. 1-5, the cooling pack 100 is positioned forward of the front cabin 20 and the prime mover 50 such that an airgap (e.g., open space, a cab-tilt space, etc.), shown as airgap 90, is formed between the cooling pack 100, the frame 12, the prime mover 50, the hood 24, and/or the front cabin 20. As shown in FIGS. 2-6, the cooling pack 100 includes a heat exchanger, shown as radiator 110; a cooling element, shown as fan 120; a ring, shown as fan ring 130; a shroud, shown as fan shroud 140; and a plurality of fluid conduits, shown as coolant conduits 150.

Figure 2:
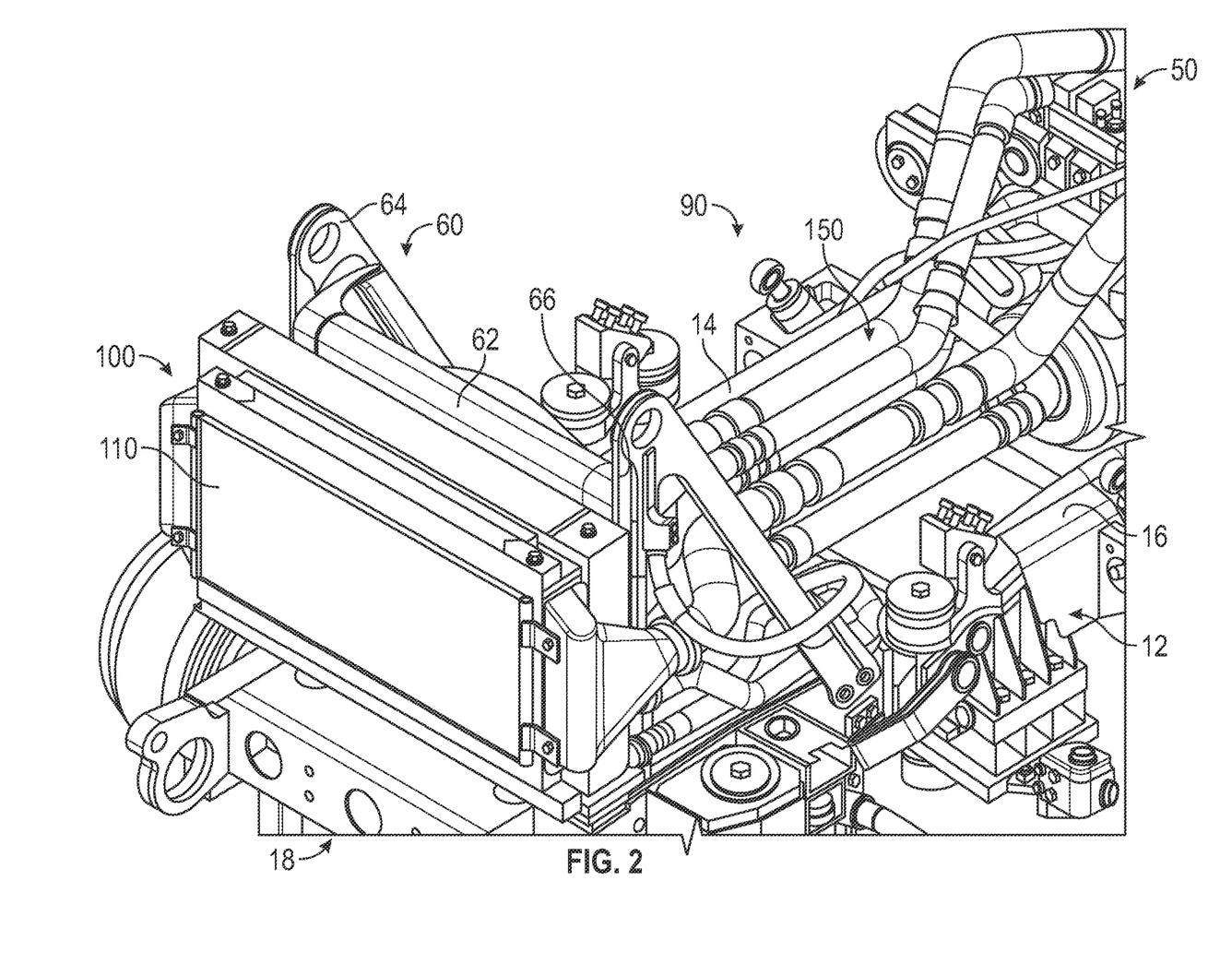
FIG. 2 is a front perspective view of a cooling pack for a prime mover of the vehicle of FIG. 1, according to an exemplary embodiment.
Figure 3:
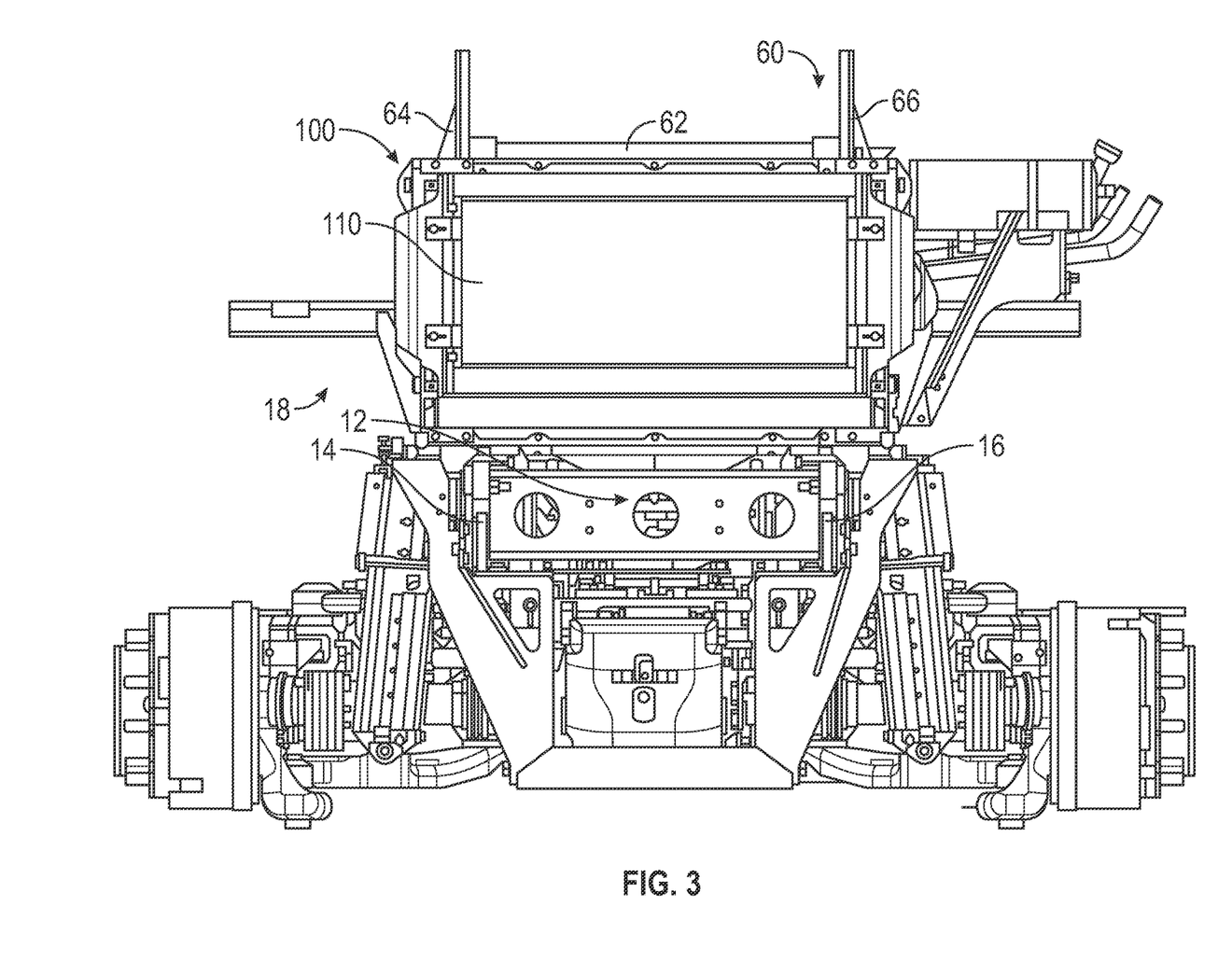
FIG. 3 is a front view of the cooling pack of FIG. 2, according to an exemplary embodiment.
Figure 4:
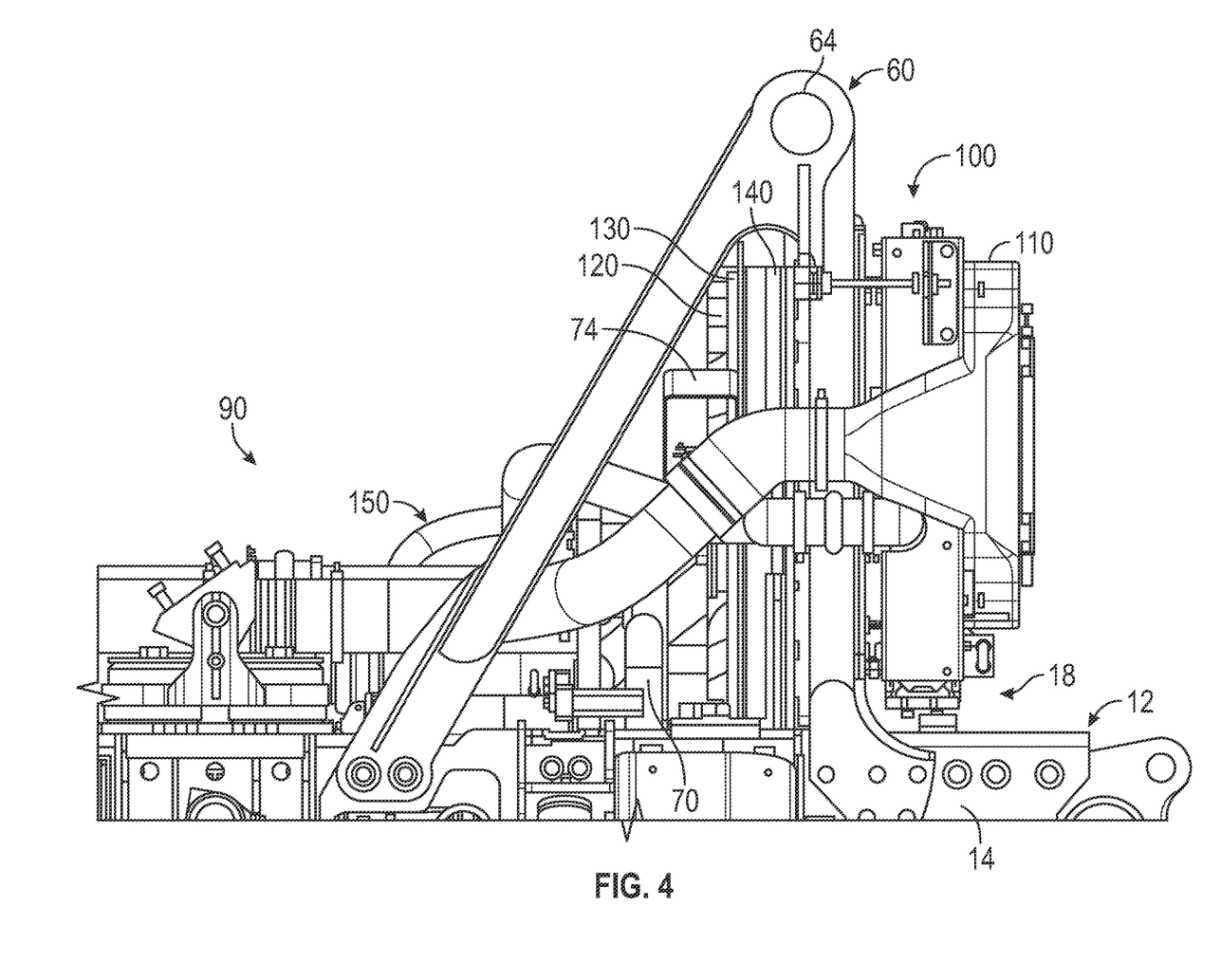
FIG. 4 is a right view of the cooling pack of FIG. 2, according to an exemplary embodiment.
Figure 5:
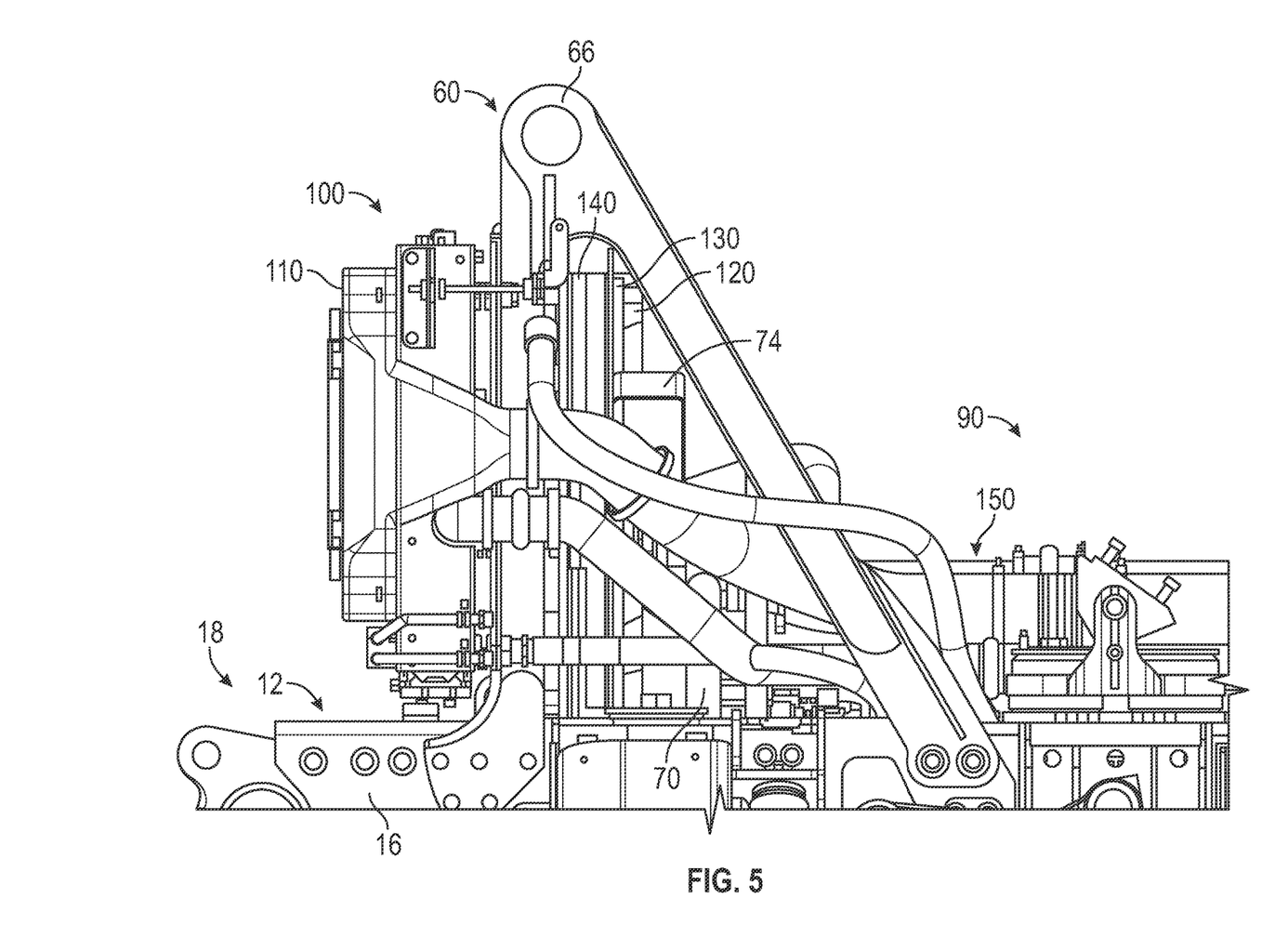
FIG. 5 is a left side view of the cooling pack of FIG. 2, according to an exemplary embodiment.

As shown in FIGS. 2-5, the radiator 110 is positioned at an end of the frame 12, shown as front end 18. The radiator 110 is coupled to the frame 12 by a first support structure, shown as A-arm support 60. The A-arm support 60 includes a first member, shown as cross member 62; a second member, shown as right A-arm 64; and a third support member, shown as left A-arm 66. As shown in FIG. 4, the right A-arm 64 is coupled to and extends from a first frame rail of the frame 12, shown as right frame rail 14. As shown in FIGS. 2 and 5, the left A-arm 66 is coupled to and extends from a second frame rail, shown as left frame rail 16, of the frame 12 spaced from the right frame rail 14. As shown in FIGS. 2 and 3, the cross member 62 extends between the right A-arm 64 and the left A-arm 66.

As shown in FIGS. 2 and 3, the radiator 110 is positioned above (e.g., on top of, etc.) the right frame rail 14 and the left frame rail 16 of the frame 12. In one embodiment, the radiator 110 is sized such that radiator 110 extends between the right frame rail 14 and the left frame rail 16. According to the exemplary embodiment shown in FIG. 2, the radiator 110 is wider than the spacing between the right frame rail 14 and the left frame rail 16 (e.g., the radiator 110 extends beyond the right frame rail 14 and the left frame rail 16, etc.). In other embodiments, the radiator 110 has a width equal to or less than the distance between the right frame rail 14 and the left frame rail 16. According to an exemplary embodiment, the radiator 110 is configured to facilitate cooling a fluid or coolant (e.g., engine coolant, etc.) within the radiator 110 (e.g., through a heat exchange process with air flowing therethrough, etc.). As shown in FIGS. 2, 4, and 5, the coolant conduits 150 extend from the radiator 110 to the prime mover 50 to facilitate providing the coolant between the radiator 110 and the prime mover 50 (e.g., with a coolant pump, etc.).

Figure 6:
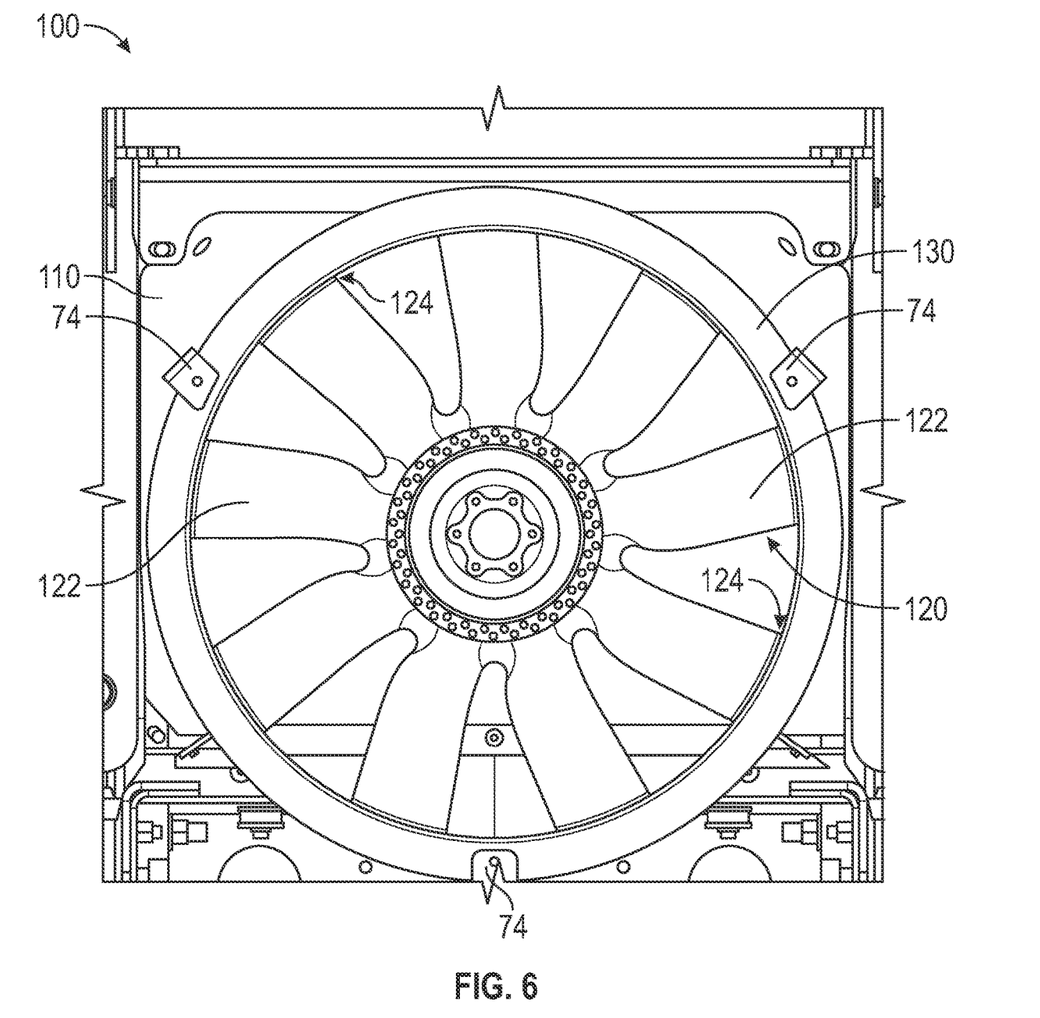
FIG. 6 is a rear view of the cooling pack of FIG. 2, according to an exemplary embodiment.

As shown in FIGS. 4-6, the fan 120 is positioned behind and proximate the radiator 110. According to an exemplary embodiment, the fan 120 is configured to draw air through the radiator 110 to cool the coolant within the radiator 110. According to an exemplary embodiment, the fan 120 is coupled to a pulley assembly, and a drive shaft extends between the pulley assembly and a power take-off ("PTO") of the prime mover 50. The drive shaft and pulley assembly may be configured to facilitate remotely driving the fan 120 with the prime mover 50. In other embodiments, the drive shaft is directly coupled to the fan 120.

As shown in FIGS. 4 and 5, a second support structure, shown as fan support 70, is positioned to couple the fan 120 to the frame 12 of the vehicle 10. As shown in FIGS. 4-6, the fan support 70 includes a plurality of brackets, shown as arms 74, the extend from the fan support 70. The arms 74 are positioned to couple the fan ring 130 around the fan 120. As shown in FIGS. 4 and 5, the fan shroud 140 is positioned between (i) the fan 120 and the fan ring 130 and (ii) the radiator 110. According to an exemplary embodiment, the fan shroud 140 is supported by the fan support 70.

As shown in FIG. 6, the fan 120 includes a plurality of tips or fins, shown as fan tips 122, that are spaced a distance from the fan ring 130 (and the fan shroud 140), shown as fan tip clearance 124. According to an exemplary embodiment, the efficiency of the cooling pack 100 is based at least in part on the fan tip clearance 124. By way of example, the smaller the fan tip clearance 124 is, the greater the efficiency of the cooling pack 100 may be. According to an exemplary embodiment, the arrangement of the cooling pack 100 facilitates minimizing the fan tip clearance 124 such that efficiency of the cooling pack 100 is increased. In traditional cooling pack arrangements, a fan is coupled to the engine and a shroud is coupled to a radiator (e.g., which is separately coupled to the chassis, etc.). Such an arrangement causes increased relative movement between the fan and the shroud (e.g., the fan moves with the engine under varying loading conditions, etc.). The increased relative movement forces a corresponding increase in the fan tip clearance to provide sufficient clearance for accommodating the increased relative movement therebetween, which disadvantageously decreases the efficiency of such a cooling pack. According to the exemplary embodiment shown in FIGS. 4-6, mounting the fan 120, the fan ring 130, and the fan shroud 140 together with a single support structure (i.e., the fan support 70) proximate the radiator 110 minimizes relative movement between the fan 120 and the fan shroud 140 such that the fan tip clearance 124 may be minimized, which advantageously increases the efficiency of the cooling pack 100.

Another advantage of the arrangement of the cooling pack 100 includes the positioning of the cooling pack 100 relative to the prime mover 50 such that the airgap 90 is formed therebetween. According to an exemplary embodiment, the airgap 90 facilitates increased cooling of the prime mover 50 and/or the radiator 110. Traditional cooling system arrangements include a radiator and a fan immediately positioned in front of an engine under the hood of a vehicle. Such close positioning between the cooling system and the engine restricts the flow of the air through the fan (e.g., due to the close proximity of the fan to the engine, etc.). The cooling pack 100 of the present disclosure is advantageously positioned ahead of the prime mover 50 such that the flow of air through the fan 120 and pushed rearward of the cooling pack 100 is not restricted, but can freely flow into the airgap 90, increasing the cooling capability of the cooling pack 100 (e.g., more air is drawn through the radiator 110, increased airflow to the prime mover 50, etc.).

According to an exemplary embodiment, the minimization of the fan tip clearance 124 and the formation of the airgap 90 between the cooling pack 100 and the prime mover 50 facilitate expelling increased thermal load/energy generated by the prime mover 50. The arrangement of the cooling pack 100 therefore facilitates increasing the performance of the prime mover 50 (e.g., horsepower output, torque output, etc. thereof) by facilitating the tuning of the prime mover 50 for increased performance (e.g., which then generates increased thermal load during operation which is able to be removed by the cooling pack 100, etc.).

Fan Drive Arrangement

According to the exemplary embodiment shown in FIGS. 7-11, the cooling pack 100 includes a fan system, shown as fan system 200. It should be understood that the fan system 200 may be or include many of the components of the cooling pack 100 (e.g., the fan 120, the fan ring 130, the fan shroud 140, etc.) described and shown herein in relation to FIGS. 2-6. As shown in FIGS. 7-11, the fan system 200 includes a plate, shown as support plate 210; a first support member, shown as first pulley support 220; a second support member, shown as second pulley support 230; a pulley assembly supported by the first pulley support 220 and the second pulley support 230; a cooling element (e.g., the fan 120, etc.), shown as fan 270, supported by the second pulley support 230 (e.g., the fan support 70, etc.); and an energy generation device, shown as alternator 290. In some embodiments, the fan system 200 does not include the alternator 290. As shown in FIGS. 7-11, the pulley assembly includes a plurality of rotational members (e.g., pulleys, sheaves, wheels, etc.) including a first rotational member, shown as drive pulley 250; a second rotational member, shown as fan pulley 252; a third rotational member, shown as first intermediate pulley 254; a fourth rotational member, shown as alternator pulley 256; a fifth rotational member, shown as second intermediate pulley 258; and a belt, shown as pulley belt 260. In other embodiments, the pulley assembly does not include each of the drive pulley 250, fan pulley 252, the first intermediate pulley 254, the alternator pulley 256, and the second intermediate pulley 258 (e.g., the pulley assembly does not include at least one of the first intermediate pulley 254, the alternator pulley 256, and the second intermediate pulley 258 in embodiments where the fan system 200 does not include the alternator 290, etc.).

As shown in FIGS. 7 and 9-11, the support plate 210 extends between a first frame rail of the frame 12, shown as right frame rail 14, and a second frame rail of the frame 12 spaced from the right frame rail 14, shown as left frame rail 16. As shown in FIGS. 7 and 9-11, the first pulley support 220 and the second pulley support 230 are coupled to and extend from the support plate 210, coupling the pulley assembly and the fan 270 to the support plate 210. According to an exemplary embodiment, the second pulley support 230 is a tubular member having a U-shape profile. According to the exemplary embodiment shown in FIGS. 7 and 9-11, the support plate 210 is positioned along the frame 12 such that the support plate 210 is proximate the front end 18 of the frame 12 and the vehicle 10. According to an exemplary embodiment, the fan system 200 (e.g., the support plate 210, the first pulley support 220, the second pulley support 230, the fan 270, the pulley assembly, the alternator 290, etc.) is positioned forward of the prime mover 50 and the front cabin 20 (e.g., under the hood of the vehicle 10, etc.).

Figure 7:
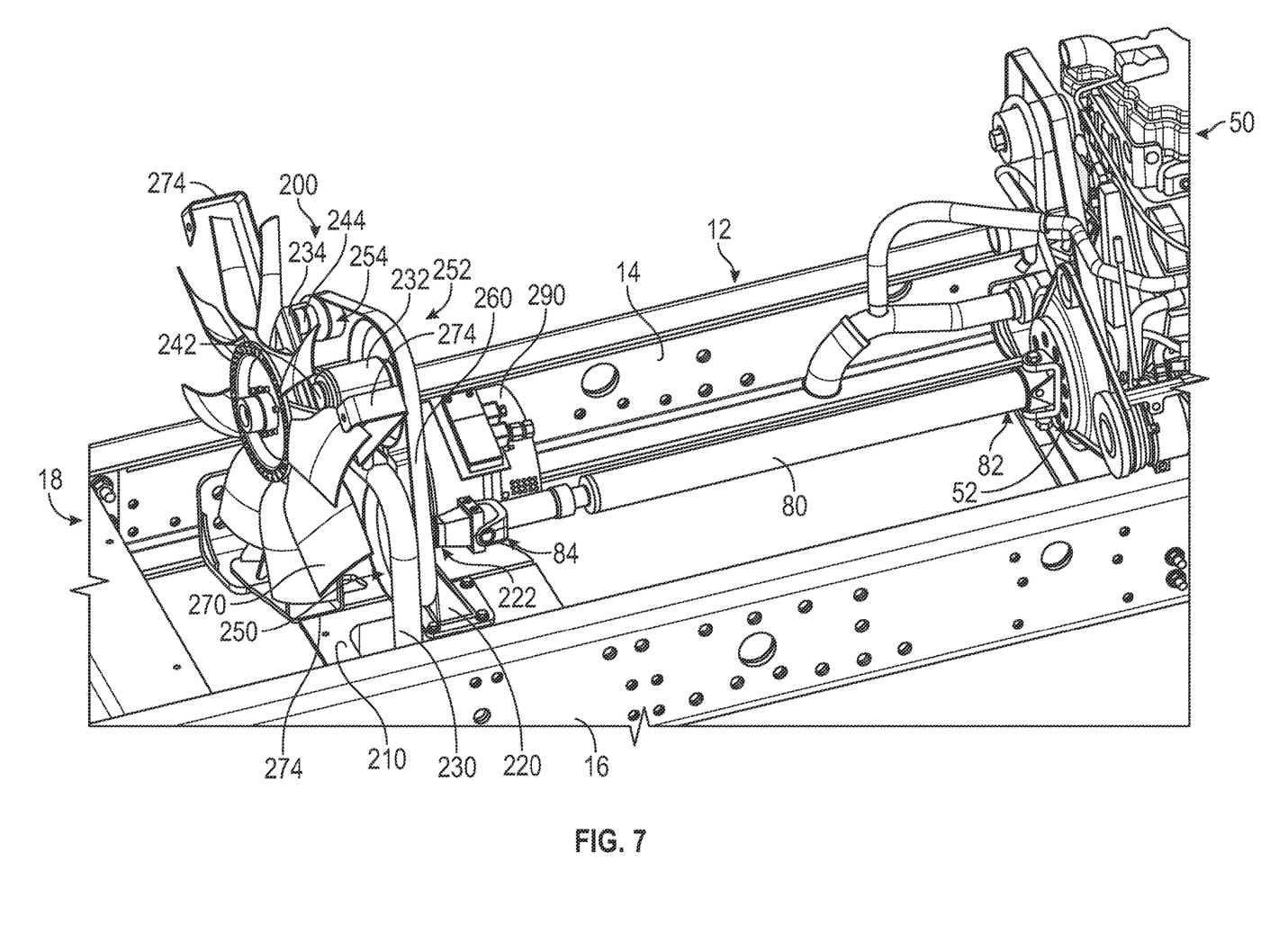
FIG. 7 is a front perspective view of a fan system coupled to a prime mover of the vehicle of FIG. 1, according to an exemplary embodiment.
Figure 9:
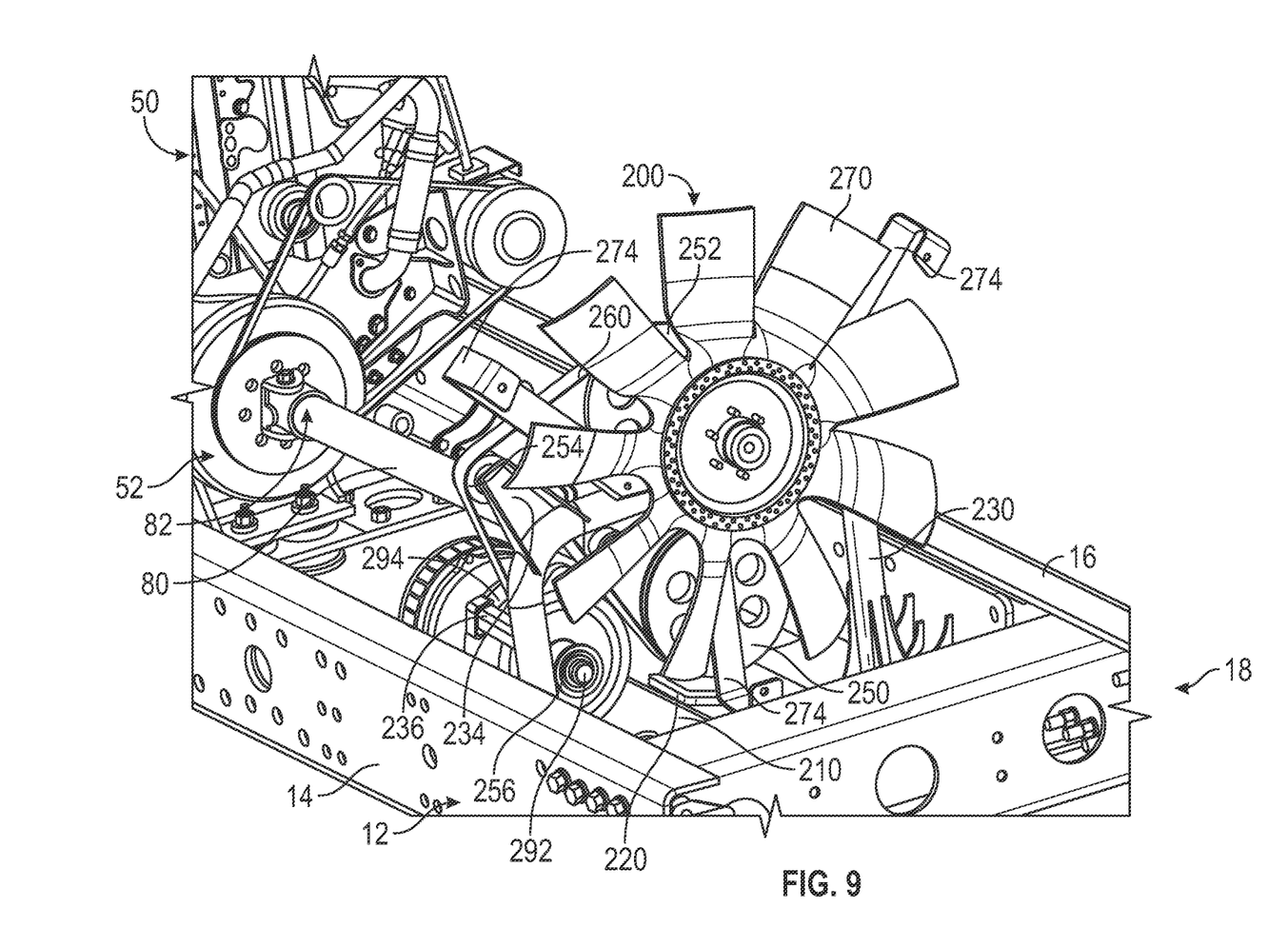
FIG. 9 is a detailed front perspective view of the fan system of FIG. 7, according to an exemplary embodiment.
Figure 10:
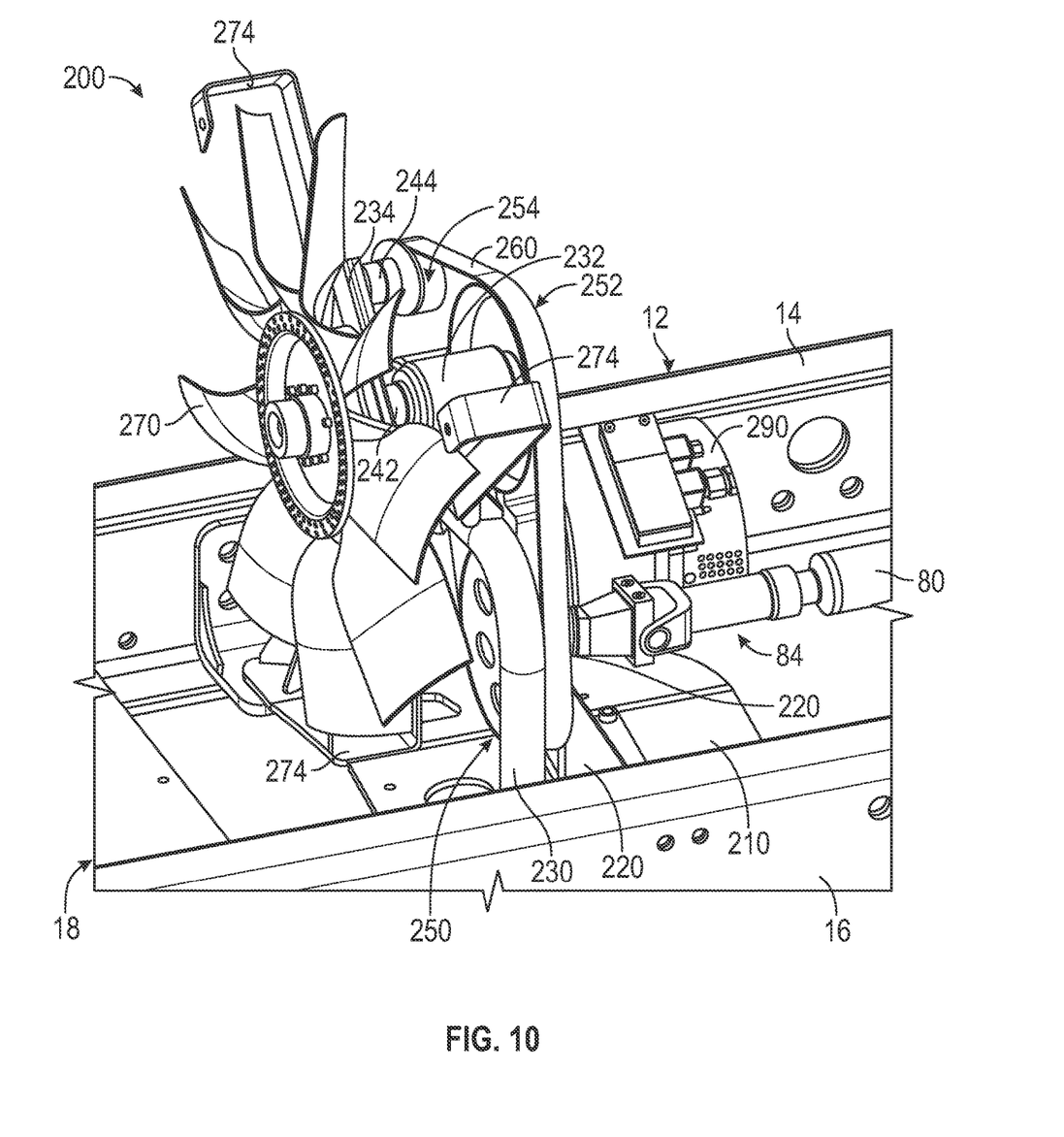
FIG. 10 is a detailed side view of the fan system of FIG. 7, according to an exemplary embodiment.
Figure 11:
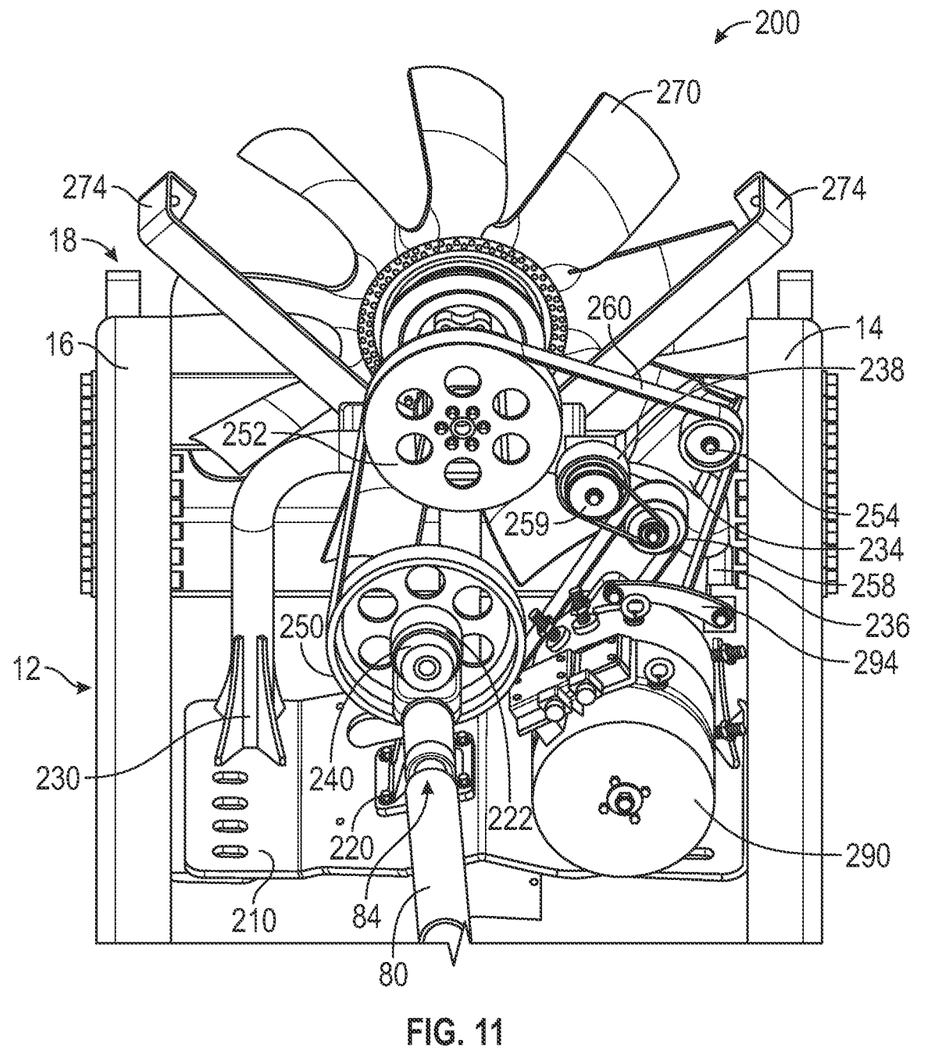
FIG. 11 is a detailed rear view of the fan system of FIG. 7, according to an exemplary embodiment.

As shown in FIGS. 7,10, and 11, the first pulley support 220 includes a first interface, shown as drive interface 222. As shown in FIG. 11, the drive interface 222 engages with (e.g., receives, etc.) a first shaft, shown as drive shaft 240, configured to rotationally couple the drive pulley 250 to the first pulley support 220. As shown in FIGS. 7 and 9-11, the first pulley support 220 extends upward from the support plate 210 such that the drive pulley 250 is elevated relative to the support plate 210. As shown in FIGS. 7-11, the vehicle 10 includes a connector, shown as connecting shaft 80, having a first end, shown as first end 82, coupled to an prime mover interface, shown as prime mover power take-off ("PTO") 52, of the prime mover 50, and an opposing second end, shown as second end 84, coupled to the drive shaft 240 of the pulley assembly. The connecting shaft 80 is thereby positioned to extend between and couple the prime mover 50 to the fan system 200. The connecting shaft 80 may be manufactured from steel, a composite material (e.g., carbon fiber, etc.), and/or still another material. According to an exemplary embodiment, the prime mover PTO 52 is connected to and driven by a crankshaft of the prime mover 50. The crankshaft of the prime mover 50 may thereby directly drive the connecting shaft 80 and the drive pulley 250. In other embodiments, the drive pulley 250 is replaced with the fan 270 such that the fan 270 is directly coupled to the second end 84 of the connecting shaft 80 such that the fan 270 is directly driven by the crankshaft of the prime mover 50 off of the prime mover PTO 52.

Figure 8:
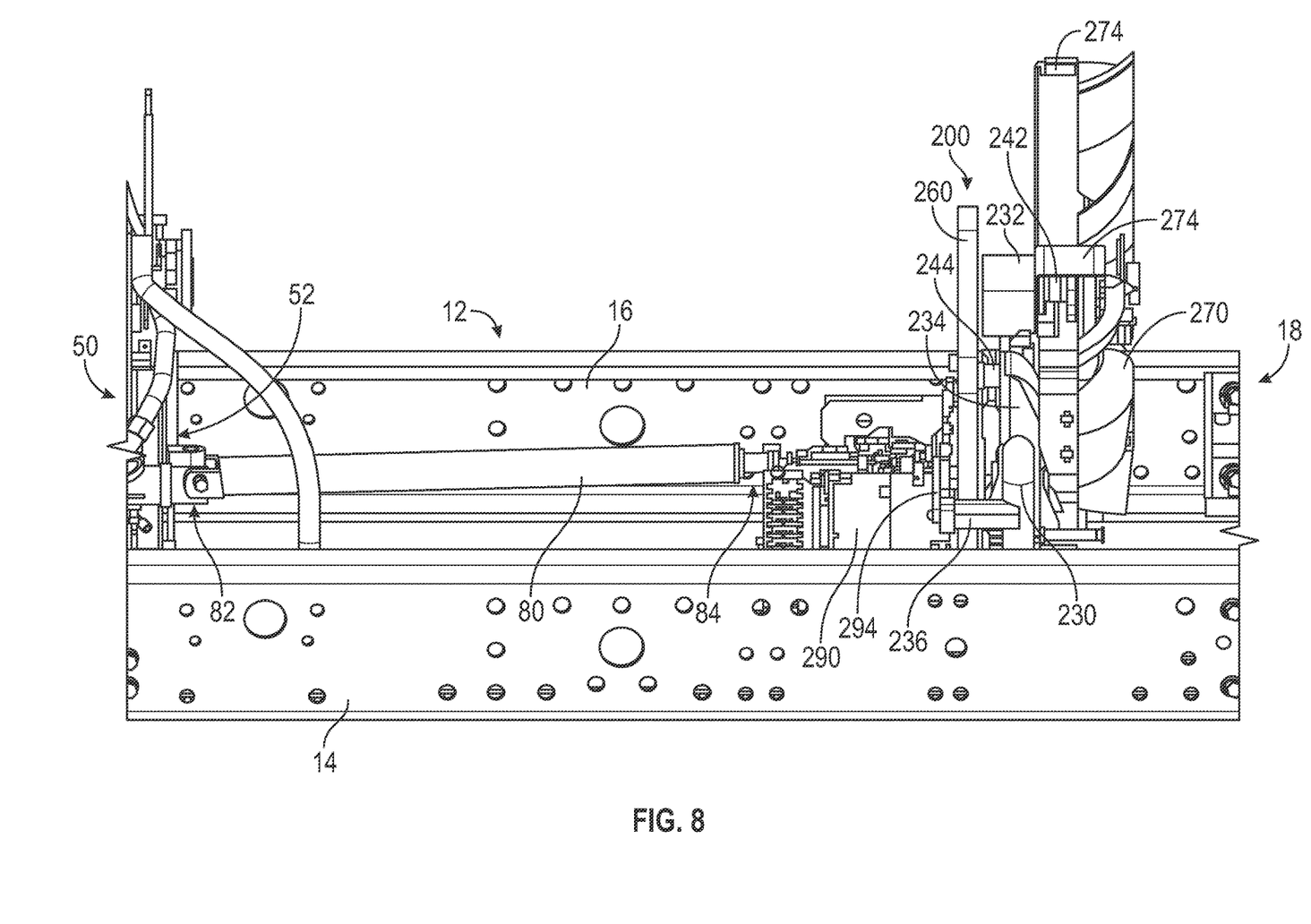
FIG. 8 is a side view of the fan system of FIG. 7, according to an exemplary embodiment.

As shown in FIGS. 7-11, the second pulley support 230 includes a second interface, shown as fan interface 232; a third interface, shown as first intermediate interface 234; a fourth interface, shown as alternator interface 236; and a fifth interface, shown as second intermediate interface 238. As shown in FIGS. 7,8, and 10, the fan interface 232 engages with (e.g., receives, etc.) a second shaft, shown as fan shaft 242, configured to rotationally couple the fan pulley 252 and the fan 270 to the second pulley support 230. As shown in FIGS. 7-11, the second pulley support 230 extends upward from the support plate 210 such that the fan pulley 252 and the fan 270 are elevated relative to the support plate 210. According to an exemplary embodiment, the second pulley support 230 elevates the fan 270 such that the fan 270 is positioned substantially (e.g., completely, mostly, etc.) above the right frame rail 14 and the left frame rail 16. In other embodiments, the fan 270 is at least partially disposed between the right frame rail 14 and the left frame rail 16. Positioning the fan 270 above the frame 12 may provide additional space along the right frame rail 14 and the left frame rail 16 to position various auxiliary components of the vehicle 10 along the frame 12. As shown in FIGS. 7-11, the fan system 200 includes a plurality of brackets (e.g., the arms 74, etc.), shown as support arms 274, that extend from the second pulley support 230. According to an exemplary embodiment, the support arms 274 are configured to facilitate coupling a fan ring (e.g., the fan ring 130, etc.) and/or a fan shroud (e.g., the fan shroud 140, etc.) around the fan 270.

As shown in FIGS. 7-11, the first intermediate interface 234 engages with (e.g., receives, etc.) a third shaft, shown as first intermediate shaft 244, configured to rotationally couple the first intermediate pulley 254 to the second pulley support 230. As shown in FIGS. 8, 9, and 11, the alternator interface 236 extends from the second pulley support 230 (e.g., away from the front end 18, etc.) and engages with a bracket, shown as alternator bracket 294. The alternator bracket 294 extends from the alternator interface 236 to the alternator 290 such that the alternator bracket 294 couples the alternator 290 to the alternator interface 236. In some embodiments, the alternator 290 is additionally coupled to the support plate 210 (e.g., with brackets or pads on the bottom of the alternator 290, etc.). As shown in FIG. 9, the alternator 290 includes an input, shown as input shaft 292, that engages (e.g., receives, etc.) and rotationally couples the alternator pulley 256 to the alternator 290. As shown in FIG. 11, the second intermediate interface 238 engages with an arm, shown as carrier arm 259. The carrier arm 259 is configured to couple the second intermediate pulley 258 to the second intermediate interface 238, offset relative to the second intermediate interface 238. In other embodiments, the second intermediate pulley 258 is otherwise coupled to the second intermediate interface 238 (e.g., the second intermediate interface 238 engages with a second intermediate shaft configured to rotationally couple the second intermediate pulley 258 to the second pulley support 230, etc.).

As shown in FIGS. 7-11, the pulley belt 260 is configured to couple the fan pulley 252, the first intermediate pulley 254, the alternator pulley 256, and the second intermediate pulley 258 to the drive pulley 250 such that the crankshaft of the prime mover 50 drives the fan 270 (e.g., through the fan pulley 252, to provide a cooling operation to a radiator of the vehicle 10, etc.) and the alternator 290 (e.g., through the alternator pulley 256, to generate electrical energy, etc.). According to an exemplary embodiment, the pulley belt 260 and the pulley assembly facilitate mounting the fan 270 in the most optimal position to increase the cooling capacity thereof.

According to an exemplary embodiment, the connecting shaft 80 facilitates remotely positioning the fan 270 and the alternator 290 ahead of the front cabin 20 towards the front end 18 of the frame 12 away from the prime mover 50 (e.g., which is positioned beneath and/or behind the front cabin 20, etc.). Remotely positioning the alternator 290 ahead of the front cabin 20 may reduce the risk of contact between the alternator 290 and the front cabin 20 during a blast event (e.g., prevents the alternator 290 from becoming a projectile that engages with the front cabin 20, etc.).

The present disclosure contemplates methods, systems, and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

As utilized herein, the terms "approximately", "about", "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the terms "exemplary" and "example" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like, as used herein, mean the joining of two members directly or indirectly to one another. Such joining may be stationary (e.g., permanent, etc.) or moveable (e.g., removable, releasable, etc.). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," "between," etc.) are merely used to describe the orientation of various elements in the figures. It should be noted that the orientation of various elements may differ according to other exemplary embodiments, and that such variations are intended to be encompassed by the present disclosure.

Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

It is important to note that the construction and arrangement of the systems as shown in the exemplary embodiments is illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the components described herein may be constructed from any of a wide variety of materials that provide sufficient strength or durability, in any of a wide variety of colors, textures, and combinations. Accordingly, all such modifications are intended to be included within the scope of the present inventions. Other substitutions, modifications, changes, and omissions may be made in the design, operating conditions, and arrangement of the preferred and other exemplary embodiments without departing from scope of the present disclosure or from the spirit of the appended claims.

The invention claimed is:

1. A vehicle comprising:
a chassis;
a cab coupled to the chassis;
a prime mover coupled to the chassis and positioned at least one of beneath or behind the cab; and
an accessory drive including:
an accessory positioned forward of a front of the cab such that the accessory is spaced from the prime mover; and
a connecting shaft extending from the prime mover, past the front of the cab, and to the accessory, wherein the connecting shaft is positioned to facilitate driving the accessory with the prime mover.

2. The vehicle of claim 1, wherein the connecting shaft is directly coupled to an input of the accessory such that the accessory is directly driven by the connecting shaft.

3. The vehicle of claim 1, wherein the connecting shaft is offset from an input of the accessory such that the accessory is indirectly driven by the connecting shaft.

4. The vehicle of claim 1, wherein the accessory drive includes a pulley assembly coupling the connecting shaft to an input of the accessory.

5. The vehicle of claim 4, wherein the accessory includes at least one of a fan or an alternator driven by the pulley assembly.

6. The vehicle of claim 1, wherein the accessory includes a fan.

7. The vehicle of claim 6, further comprising a radiator positioned proximate the fan.

8. The vehicle of claim 7, further comprising a shroud positioned between the radiator and the fan, wherein the shroud and the fan are coupled to the chassis by a single support structure.

9. The vehicle of claim 7, further comprising a conduit assembly coupled to the radiator, the conduit assembly positioned to facilitate providing coolant from the radiator to a component of the vehicle.

10. The vehicle of claim 9, wherein the component is the prime mover.

11. The vehicle of claim 7, further comprising a hood having a front end and a rear end, wherein the rear end of the hood is positioned proximate the front of the cab, wherein the radiator is positioned proximate the front end of the hood, and wherein an airgap is positioned beneath the hood.

12. The vehicle of claim 1, wherein the prime mover is an engine.

13. The vehicle of claim 1, wherein the prime mover is a motor.

14. A system for a vehicle, the system comprising:
an accessory drive including:
an accessory; and
a connecting shaft configured to couple the accessory to a prime mover of the vehicle, wherein the connecting shaft has a length such that (i) the accessory is positioned forward of a front of a cab of the vehicle and (ii) the connecting shaft extends rearwardly past the front of the cab to the prime mover when the accessory drive is installed on the vehicle.

15. The system of claim 14, wherein the connecting shaft is directly coupled to an input of the accessory such that the accessory is directly driven by the connecting shaft.

16. The system of claim 14, wherein the accessory drive includes a pulley assembly coupling the connecting shaft to an input of the accessory.

17. The system of claim 16, wherein the accessory includes at least one of a fan or an alternator driven by the pulley assembly.

18. The system of claim 14, wherein the accessory includes a fan, further comprising a radiator positioned proximate the fan.

19. The system of claim 18, further comprising at least one of:
a shroud positioned between the radiator and the fan; or
a conduit assembly coupled to the radiator, the conduit assembly configured to facilitate providing coolant from the radiator to a component of the vehicle.

20. A vehicle comprising:
a chassis;
a cab coupled to the chassis;
a prime mover coupled to the chassis and positioned at least one of beneath or behind the cab;
an accessory positioned forward of a front of the cab such that the accessory is spaced from the prime mover, the accessory includes at least one of a fan or an alternator; and
a connecting shaft extending from the prime mover, past the front of the cab, and coupled to the accessory, wherein the connecting shaft facilitates driving the accessory with the prime mover.

\* \* \* \* \*